(12) United States Patent
Le Coënt

(10) Patent No.: US 6,313,336 B1
(45) Date of Patent: Nov. 6, 2001

(54) SYNTHESIS OF AN OVERBASED DETERGENT FROM SLUDGE COMING FROM THE PRODUCTION OF HIGH BN OVERBASED ALKYLARYL SULFONATE OR OVERBASED SULFURIZED ALKYLPHENATE

(75) Inventor: Jean Louis Le Coënt, Le Havre (FR)

(73) Assignee: Chevron Oronite S.A. (FR)

( * ) Notice: Subject to any disclaimer, the term of this patent is extended or adjusted under 35 U.S.C. 154(b) by 0 days.

(21) Appl. No.: 09/698,703

(22) Filed: Oct. 26, 2000

Related U.S. Application Data

(62) Division of application No. 09/470,093, filed on Dec. 21, 1999, now Pat. No. 6,239,309.

(51) Int. Cl.⁷ .................... C07C 303/46; C07C 309/30
(52) U.S. Cl. ................................. 558/44; 562/45
(58) Field of Search ................. 562/45; 558/44

(56) References Cited

FOREIGN PATENT DOCUMENTS 1 015 769    1/1966   (GB) .

*Primary Examiner*—T. A. Solola
(74) *Attorney, Agent, or Firm*—Walter L. Stumpf; Richard J. Sheridan

(57) ABSTRACT

A process for using sludge formed in the preparation of a high BN overbased alkylaryl sulfonate or overbased sulfurized alkylphenate, wherein the sludge is treated with an acidic reactant to convert large particles of the alkaline earth metal salt in the sludge into calcium sulfonate, then is reacted with an excess of alkaline earth base and either alkylaryl sulfonic acid or alkylphenol to produce a reaction product, which could be a low or high overbased alkylaryl sulfonate or overbased sulfurized alkylphenate.

15 Claims, No Drawings

SYNTHESIS OF AN OVERBASED DETERGENT FROM SLUDGE COMING FROM THE PRODUCTION OF HIGH BN OVERBASED ALKYLARYL SULFONATE OR OVERBASED SULFURIZED ALKYLPHENATE

This application is a 37 CFR 1.53(b) divisional application of U.S. Ser. No. 09/470,093 that was filed on Dec. 21, 1999 now U.S. Pat. No. 6,239,309.

The present invention relates to a process for using sludge produced during the production of either a high BN overbased alkylaryl sulfonate or an overbased sulfurized alkylphenate to produce overbased alkylaryl sulfonate or overbased sulfurized alkylphenate.

BACKGROUND OF THE INVENTION

Commercially, sulfonic acid is reacted with lime, methanol, xylene, carbon dioxide, and calcium hydroxide to produce a high BN overbased alkylaryl sulfonate. The high BN sulfonate is often passed through a centrifuge to remove sediment. For every 10,000 metric tons of sulfonate final product produced, there is about 900 metric tons of sludge residue. That sludge residue (a cake) comprises about 20% lime and calcium carbonate, about 20 to 25% high BN overbased alkylaryl sulfonate with calcium carbonate dissolved in the sulfonate, and about 55% solvent (e.g., xylene). For the time being, this sludge residue is burned, which is not desirable economically or environmentally.

A similar problem results, to some extent, in the production of a commercial overbased sulfurized alkylphenate, which produces a similar sludge residue that is normally burnt. In a typical commercial process, an alkylphenol is reacted with sulfur, lime, and glycol, preferably associated with a mono alcohol, in the presence of a low overbased sulfonate and diluent oil, then the product is overbased with carbon dioxide. The production of such an overbased sulfurized alkylphenate is described in British patent 1,015,769.

SUMMARY OF THE INVENTION

The present invention is based upon work trying to provide a better use of the sludge residue. The invention provides for treatment of that sludge residue to produce overbased alkylaryl sulfonate or overbased sulfurized alkylphenate.

Recycle of the sludge to the bottom of the reactor, where the high BN overbased alkylaryl sulfonate is produced, would not work because the solubility of the resulting sulfonate would be poor because of accumulation of impurities.

If the sludge from the production of high BN overbased alkylaryl sulfonate is passed through a decanter, the centrate contains high BN overbased alkylaryl sulfonate, xylene, and about 1% to 3% sediment, and the residue from the decanter is a concentrated sludge. Recycle of the centrate back to the centrifuge would not work because the resulting final high BN overbased alkylaryl sulfonate would have solubility problems.

We have developed processes for using the sludge formed in the preparation of a high BN overbased alkylaryl sulfonate to produce additional high BN overbased alkylaryl sulfonate. That sludge comprises high BN overbased alkylaryl sulfonate, alkaline earth metal salt, alkaline earth metal base, and other impurities. The processes depend, in part, on how the sludge has to be separated from high BN overbased alkylaryl sulfonate.

If centrifugation is needed to separate the sludge from high BN overbased alkylaryl sulfonate, then the sludge is passed through a phase separation system (e.g., decanter) to form a lower density fraction (e.g., centrate) and a higher density fraction (e.g., filtrate). The lower density fraction has high BN overbased alkylaryl sulfonate and reduced levels of alkaline earth metal salt, alkaline earth metal base, and other impurities. The higher density fraction has increased levels of said alkaline earth metal salt, alkaline earth metal base, and other impurities. If centrifugation is not needed to separate the sludge from the high BN overbased alkylaryl sulfonate, then the use of the phase separation system is not necessary.

If a phase separation system is used, the lower density fraction coming from that phase separation system is treated with an acidic reactant. On the other hand, if no phase separation system is used, the sludge is treated with an acidic reactant. In both cases, the acidic reactant (preferably alkylaryl sulfonic acid) eliminates the big large particle size alkaline earth metal salt by converting it into calcium sulfonate. At least one equivalent of acidic reactant is used for each equivalent of alkaline earth metal salt. For instance, if the acidic reactant is an alkylaryl sulfonic acid then at least two moles of acid must be used per mole of alkaline earth metal salt, since the salt is divalent while the acid is monovalent. Preferably, this step is carried out in the presence of a mixture of methanol and xylene.

The treated product is then reacted with an excess of alkaline earth base, and preferably with alkylaryl sulfonic acid, and preferably either in the presence of a mixture of methanol and xylene or in the presence of chloride ions and a carboxylic acid containing 1 to 4 carbon atoms, to produce a reaction product containing additional high BN overbased alkylaryl sulfonate and additional sludge.

If the original sludge is filtered, instead of centrifuged, and if there is no decanting step, then the additional high BN overbased alkylaryl sulfonate should be filtered.

The process depends, in part, on how the process incorporates the sludge and how impurities are eliminated.

In one case, where centrifugation is needed to separate the sludge from high BN overbased alkylaryl sulfonate, the sludge is treated with an acidic reactant, preferably alkylarylsulfonic acid, eventually in presence of a methanol and (or) xylene. For instance, if the acidic reactant is an alkylaryl sulfonic acid then at least two moles of acid must be used per mole of alkaline earth metal salt, since the salt is divalent while the acid is monovalent. At least one equivalent of acidic reactant is used for each equivalent of alkaline earth metal salt. The treated product is then reacted with an excess of alkaline earth base and preferably with alkylaryl sulfonic acid in the presence of chloride and a carboxylic acid containing 1 to 4 carbons atoms to produce a reaction product containing low BN overbased alkylarylsulfonate and additional sludge which is filtered.

Similarly, we have developed processes for using the sludge formed in the preparation of an overbased sulfurized alkylphenate to produce additional overbased sulfurized alkylphenate. That sludge comprises overbased sulfurized alkylphenate, alkaline earth metal salt, alkaline earth metal base, and other impurities. The processes also depend, in part, on how the sludge has to be separated from overbased sulfurized alkylphenate.

Like in the processes described above, if centrifugation is needed to separate the sludge from the overbased sulfurized alkylphenate, then the sludge is passed through a phase separation system to form a lower density fraction and a higher density fraction. The lower density fraction has overbased sulfurized alkylphenate and reduced levels of alkaline earth metal salt, alkaline earth metal base, and other impurities. The higher density fraction has increased levels of said alkaline earth metal salt, alkaline earth metal base, and other impurities. If centrifugation is not needed to separate the sludge from the overbased sulfurized alkylphenate, then the use of the phase separation system is not necessary.

Like in the processes described above, the lower density fraction (if centrifugation is needed) or sludge (if centrifugation is not needed) is treated with an acidic reactant, preferably alkylaryl sulfonic acid, to reduce the average particle size of the alkaline earth metal salt by converting it into calcium sulfonate. At least one equivalent of acidic reactant is used for each equivalent of alkaline earth metal salt. For instance, if the acidic reactant is an alkylaryl sulfonic acid, then at least two moles of acid must be used per mole of alkaline earth metal salt, since the salt is divalent while this acid is monovalent. This step can be carried out in the presence of methanol and/or xylene.

The treated product is then reacted with alkylphenol, sulfur, and an excess of alkaline earth base, preferably in the presence of a glycol, and more preferably in the presence of a glycol and either 2-ethylhexanol or decyl alcohol, to produce a reaction product containing additional overbased sulfurized alkylphenate and additional sludge. The treated product can be reacted in the presence of chloride ions and a carboxylic acid containing 1 to 4 carbon atoms.

If the original sludge is filtered, instead of centrifuged, and if there is no decanting step, then the additional overbased sulfurized alkylphenate should be filtered.

DETAILED DESCRIPTION OF THE INVENTION

In its broadest aspect, the present invention provides for treatment of sludge residue to produce overbased alkylaryl sulfonate or overbased sulfurized alkylphenate.

Prior to discussing the invention in further detail, the following terms will be defined:

DEFINITIONS

As used herein, the following terms have the following meanings, unless expressly stated to the contrary:

The term "alkaline earth metal" refers to calcium, barium, magnesium, and strontium.

The term lime of slaked lime refers to the following raw material: $Ca(OH)_2$

The term "Base Number" or "BN" refers to the amount of base equivalent to milligrams of KOH in one gram of sample. Thus, higher BN numbers reflect more alkaline products, and therefore a greater alkalinity reserve. The BN of a sample can be determined by ASTM Test No. D2896, or any other equivalent procedure.

The term "overbased detergent" refers to a composition comprising a diluent (e.g., lubricating oil) and a detergent complex wherein additional alkalinity is provided by a stoichiometric excess of a metal base, based on the amount required to react with the acidic moiety of the detergent. Enough diluent oil should be incorporated in the overbased detergent to ensure easy handling at safe operating temperatures.

The term "low BN overbased detergent" refers to a detergent having a BN of up to 40.

The term "moderately overbased detergent" refers to an overbased detergent having a BN of about 150 to 225. Some moderately overbased detergents require carbonation to achieve this level of BN.

The term "high BN, overbased detergent" refers to an overbased detergent having a BN of from 225 to 440, or more. Generally a carbon dioxide treatment is required to obtain high BN overbased detergent compositions. For sulfonates, it is believed that this forms a colloidal dispersion of metal base.

The term "TAN" refers to Total Acid Number and can be determined by the procedure described in ASTM D 664.

The term "centrate" refers to the clarified material (the lower density fraction) of a decanter.

The term "filtrate" refers to the residue material (the higher density fraction) of a decanter.

Unless otherwise specified, all percentages are in weight percent, all ratios are molar ratios, and all molecular weights are number average molecular weights.

During manufacturing of high BN overbased alkylaryl sulfonate (having a base number from 225 to 550, preferably from 300 to 440), not all the slaked lime introduced is converted into calcium carbonate dispersed into Micelles. Sediment of about 2% is found, measured through the ASTM D 2273. One of the most convenient ways to eliminate this sediment during the current production is through centrifugation before elimination of the solvent (xylene for example).

Introduced continuously in a disc centrifuge was a crude mixture having the following composition:

55–65% xylene

1–3% solid sediment (predominantly slaked lime and calcium carbonate).

33–47% high BN overbased alkylaryl sulfonate.

From this disc centrifuge were two streams: a liquid stream (about 94%) and a cake (about 6%). The liquid stream (the part where sediment is eliminated) is sent to a distillation column where the xylene is eliminated and the residue is the final product: high BN overbased alkylaryl sulfonate.

The typical analysis is:

Calcium=15.5%

Sulfur=1.75%

BN=410

Active material as calcium sulfonate (ASTM D 3712)= 21.7%

$CO_2$=14.2%

For the time being, this cake (the part where sediment is concentrated), is waste that is disposed by burning. This is not the best from an economical and environmental viewpoint.

The composition of this cake is about 55% xylene, 20% sediment (slaked lime, calcium carbonate and silica), and 25% high BN overbased alkylaryl sulfonate but with some larger particles size than current materials.

If the cake is decanted and filtered on a Buchner in a laboratory, the following is obtained:

A liquid part (80%) where after elimination of xylene by stripping, it has almost the analysis characteristics of the starting high BN overbased alkylaryl sulfonate.

A solid part (20%) which is mainly made of slaked lime and calcium carbonate and silica.

Due to the high level of silica and other mineral impurities, it is not recommended to recycle the cake waste from the disc centrifuge to the beginning of the reaction for the two following main reasons:

Silica would lead to a severe wear problem on the plate of disc centrifuge.

Some compatibility problems would occur in severe oil formulations.

The first idea was to send the cake from the disc centrifuge to a horizontal (or vertical) decanter machine where one obtains also two streams.

70% the "centrate" (the clarified material) which is made of about 60% xylene and 40% high BN overbased alkylaryl sulfonate.

30% the "filtrate" (where all the sediment is concentrated). Liquid part here is only 15% and the solid part 85%.

Note: by modifying the operating conditions of decanter machine, it is possible to vary the dryness of the cake (filtrate).

After elimination of xylene, the centrate has the following composition:

Actives material=21.7%

Calcium=15.7%

Sulfur=1.7%

BN=415

$CO_2$=14.5%

Per 1 kg of centrate, after elimination of xylene, there is about 0.45 mole sulfonic acid, 3.7 mole basic calcium ($CaCO_3$+lime), and 3.3 mole $CO_2$.

The solid part of this filtrate has approximately the following composition:

Slaked lime=63.4% * Calcium carbonate=25.4%

Silica=9.4%

Magnesium oxide=1.2%

Other mineral impurity=0.6%

In order to decrease waste and improve yield of high BN overbased alkylaryl sulfonate, the first attempt was to treat the "cake" from disc centrifuge by sending it to the inlet of a decanter. The centrate was recycled into the feeding tank of "disc centrifuge" and the "filtrate" was considered as waste and was burned. The final product (high BN overbased alkylaryl sulfonate) met specifications, but in severe base oils formulations some deposit occurred.

Back to back determinations were conducted of particle size of high BN overbased alkylaryl sulfonate obtained with and without recycling the centrate. It appeared that the particle size was bigger when centrate is used than when there is no centrate. That is probably the explanation of solubility problems in severe base oil formulation. Very likely the calcium carbonate in the centrate is not as well dispersed as in the standard material.

Then the centrate was added at various steps in the neutralization. Surprisingly, it appeared that the procedure where enough sulfonic acid is added on the centrate and if the reaction is allowed to occur one obtains an acidic environment where $CaCO_3$ is converted with sulfonic acid, into calcium sulfonate and the big particles are eliminated and solubility problems disappeared. It appears that solubility is improved when the acidity coming from sulfonic acid is higher than (or equal) the basicity coming from the centrate.

EXAMPLES

The invention will be further illustrated by following examples, which set forth particularly advantageous method embodiments. While the Examples are provided to illustrate the present invention, they are not intended to limit it.

METHOD OF MEASUREMENTS

Measurement of the Amount of Sediment

The amount of sediment was determined according to ASTM Standard D 2273-67, with the following modifications:

Rotational speed of the centrifuge: 4540 rpm

Relative centrifugal force: 10,000

The product to be analyzed was diluted to a ratio of 1:4 with gasoline C (25 $cm^3$ of the product to be analyzed to 75 $cm^3$ of Gasoline C)

Duration of centrifuging: 10 minutes

Measurement of Viscosity at 100° C. in $mm/s^2$

The viscosity was measured at the temperature of 100° C. after dilution of the product to be measured in diluent oil, until a solution was obtained having a total calcium content of 15.5%. The viscosity was measured following method ASTM D 445.

Measurement of Compatibility

Two methods were used to evaluate the appearance and the storage stability of the additives and the corresponding oils containing them. These methods are applicable to additives for lubricants. With these methods, one can test a high BN overbased alkylaryl sulfonate with a good overbased sulfurized alkylphenate, or test an overbased sulfurized alkylphenate with a good high BN overbased alkylaryl sulfonate.

Method No. 1: Accelerated Stability Storage Test (ASST)

A blend of 100 grams is formed in a beaker of 250 ml of the following products:

A 250 BN overbased sulfurized alkylphenate in a quantity such that the BN coming from the phenate in blend of 100 grams is 35.

A 400 BN overbased alkylaryl sulfonate (or a 320 BN overbased alkylaryl sulfonate) in a quantity such that the BN coming from the sulfonate in the blend of 100 grams is 35.

35 grams of diluent oil named 150 bright stock (from Idemitsu Kosan Company).

Complete to 100 grams by adding 500N diluent oil (from Idemitsu Kosan Company).

The mixture is blended for thirty minutes at 65° C., then the oil obtained is put into a centrifuge tube. It is kept in an oven for 24 hours at 100° C. then centrifuged for one hour at 4540 rpm.

The sediment content is read. If the sediment content is less than 0.05% of the oil the results are a "pass," but if the sediment content is not less than 0.05% of the oil the results are a "fail."

Method No. 2: Compatibility/Solubility in a Severe Base Oil

The severe base oil the following composition:

20% bright stock (from Idemitsu Kosan Company).

80% 500N (from Idemitsu Kosan Company).

A quantity of 400 BN overbased alkylaryl sulfonate is added to the severe base oil in order to obtain a solution having 100 mmoles calcium per liter. Then the base oil and sulfonates is mixed under agitation for thirty minutes at a temperature of 80° C. The appearance of the blend is evaluated right after blending and each week thereafter. If the product is clear and bright, or very slightly cloudy, the product is considered "in specification," but if the product is turbid the product is considered in "off specification."

A third method was used to evaluate the appearance and the storage stability of the additives and the corresponding oils containing them. This method is applicable to additives for lubricants.

In this third method, an additive is prepared based on mono-succinimide and zinc dithiophosphate, and containing about 75% by weight of the mixture of sulfonates to be tested, an additive which is placed in a 350 neutral oil base stock. The appearance of the solution is examined after 30 days at ambient temperature. The appearance of the product is evaluated before and after storage, and the results are qualified as "good" or "poor" according to whether or not a single phase is maintained without any deposition by sedimentation.

Other Measurements

ASTM D 4951/D 4927 is used to measure the percent of calcium and sulfur in the final product.

ASTM D 93 is used to measure the flash point (PMCC).

ASTM D 2273 is used to measure sediment.

"% Calcium as calcium sulfonate" represents the percentage of calcium which is (or can be) neutralized by sulfonic acid. The stoichiometry is 2 moles sulfonic acid per mole of calcium, that is a way to know the quantity of sulfonic acid in the product. Such a number could be obtained through the ASTM D 3712 and particularly the percentage of active (calcium sulfonate having a molecular weight of 960) or ISO 2271. The both methods give about the same number.

Particles size of HOB sulfonates are determined on a laser scattering particle size distribution analyser trademark Horiba Model LA-920. The optical system in an ordinary laser-diffraction type analyzer condenses the forward scattering from a laser bean with a condenser Fourier Lens and forms image on the ring shaped detector located at the focal distance.

PRODUCTION OF HIGH BN OVERBASED ALKYLARYL SULFONATES

Example 1

A high BN overbased alkylaryl sulfonate was produced from a centrate, as described below:

a) Description of the Centrate 214.3 grams of centrate contained about 120 grams (1.13 mole) xylene, 20.2 grams (0.021 mole) of actives materials as calcium sulfonate, 14.0 grams (0.35 mole) basic calcium (as slaked lime+calcium carbonate), 13.6 grams (0.31 mol) carbon dioxide ($CO_2$), and 38.6 grams diluent oil 100N. This centrate was obtained by separating sludge from high BN overbased alkylaryl sulfonate by centrifugation and then passing the sludge through a decanter.

b) Acidification of the Centrate

After 200 grams of the above centrate was introduced in a 5 liters four-neck reactor provided with an agitator system and a heating/cooling device, and the agitator was started, 165 grams (5.15 mole) of methanol was introduced, followed by 779 grams (7.35 mole) of xylene, followed by 380 grams (0.684 mole) of an alkyl benzene sulfonic acid where alkyl chain is a NAO $C_{20-C24}$ added over a period of 15 minutes.

During 15 minutes, centrate, methanol, xylene and sulfonic acid were added at room temperature. At the end of the holding period, the mixture was slightly acidic. In other words, sulfonic acid can neutralize more calcium than there is in the material.

c) Overbasing Step

A slurry of 165 grams (5.15 mole) methanol, 435 grams (4.10 mole) xylene, and 366 grams (4.94 mole) slaked lime was transferred into the reactor through a funnel and the inside of the reactor was cooled down to 25° C. Then carbonation was started ($CO_2$ was introduced at the bottom of the reactor through a tube of 2 mm diameter). 162 grams (3.68 moles) $CO_2$ was introduced over a period of two hours. The temperature was kept under control (in order not to exceed 50° C.).

A second slurry was made in a beaker during the above carbonation. That second slurry contained 275 grams (2,59 mole) xylene and 93 grams (1,26 mole) slaked lime. That second slurry was transferred into the reactor through a funnel, once 162 grams of $CO_2$ was added. The introduction of $CO_2$ was not stopped during loading of the second slurry and 50 grams (1.14 moles) more of $CO_2$ was added over a period of 60 minutes. Temperature was kept under control (in order not to exceed 50° C.).

d) Elimination of Water and Methanol

The product of step (c) was heated in order to eliminate water and methanol.

e) Elimination of Impurities by Centrifugation

To the product of step (d) were added 500 grams diluent oil 600N and 1330 grams xylene, which was centrifuged in order to eliminate sediments.

f) Distillation of Xylene

The product of step (e) was distilled to remove xylene, with the final conditions: 204° C. and $4 \times 10^3$ Pa (30 mm of Mercury). The distillation occurred for 20 minutes and then vacuum was broken and the product was cooled down to room temperature.

Analysis of the product:

Calcium (CaT): 16.06%

CaS: 0.90%

Sulfur: 1.85%

Viscosity at 100° C.: 112 mm/s$^2$

Flash point (PMCC): 205° C.

Base number: 425

Sediment: 0.01% (Volume)

Particles size:
    <0.05 μm 0%
    <0.075 μm 3.63%
    <0.100 μm 51.89%
    <0.150 μm 99%
    <0.200 μm 100%

Compatibility Test One—Pass

Compatibility Test Two—"In"

Examples 2 through 4 were identical to Example 1, except for the acidification step (b) of the centrate. These examples show the effects of minor variations in the order of addition in the acidification step.

Example 2

Example 2 was carried out identically to Example 1, except for the acidification step (b) of the centrate After the introduction of 200 grams of centrate in a 5 liters four-neck reactor provided with an agitator system and a heating/cooling device, and the agitator was started, then 779 grams (7.35 mole) of xylene was introduced, followed by 380 grams (0.684 mole) of the same alkylbenzene sulfonic acid over a period of 15 minutes. At the end on this addition temperature was 400° C. Then, 165 grams (5.15 mole) of methanol was added and held over a period of 15 minutes.

The mixture was slightly acidic (TAN=14), that means the same as Example 1. Similar results to those of Example 1 were obtained.

Analysis of the product:

Calcium (CaT): 16.08%

CaS: 0.90%

Sulfur: 1.86%

Viscosity at 100° C.: 113 mm/s$^2$
Flash point (PMCC): 201° C.
Base number: 425
Sediment: 0.02% (Volume)
Compatibility Test One—Pass
Compatibility Test Two—"In"

Example 3

Example 3 was carried out identically to Example 1, except for the acidification step (b) of the centrate. In a 5 liters four-neck reactor, provided with an agitator system and a heating/cooling device, were introduced 165 grams (5.15 mole) of methanol and 779 grams (7.35 mole) of xylene. Then, at the same time, over a period of 15 minutes, 200 grams of the same centrate and 380 grams (0.684 mole) of the same alkylbenzene sulfonic acid were introduced.

At the end of the holding period, temperature was 40° C. The mixture was slightly acidic (TAN=14), that means the same as Example 1. Similar results to those of Example 1 were obtained.

Analysis of the product:
Calcium (CaT): 16.09%
CaS: 0.91%
Sulfur: 1.87%
Viscosity at 100° C.: 112 mm/s$^2$
Flash point (PMCC): 202° C.
Base number: 426
Sediment: 0.02% (Volume)
Compatibility Test One—Pass
Compatibility Test Two—"In"

Example 4

Example 4 was carried out identically to Example 1, except for the acidification step (b) of the centrate. In a 5 liters four-neck reactor, provided with an agitator system and a heating/cooling device, were introduced at the same time, and held for 15 minutes: 200 grams of centrate, 165 grams of methanol, 779 grams of xylene, and 380 grams of alkylbenzene sulfonic acid.

At the end of the holding period, temperature was 40° C. The mixture was slightly acidic (TAN=14), that means the same as Example 1. Similar results to those of Example 1 were obtained.

Analysis of the product:
Calcium (CaT): 16.06% CaS: 0.90%
Sulfur: 1.85%
Viscosity at 100° C.: 122 mm/s$^2$
Flash point (PMCC): 200° C.
Base number: 425
Sediment: 0.1% (Volume)
Compatibility Test One—Pass
Compatibility Test Two—"In"

Comparative Example A—No Acidification of the centrate a) Description of the Centrate The loads were the same as Example 1, the predominant change being that the centrate was recycled at the step (e) inlet the centrifuge machine. In this case, the centrate was not acidified so the big particles size of $CaCO_3$ were not destroyed, so solubility problems were met in severe base oil formulation.

b) Neutralization Step

In a beaker, a slurry was made of 330 grams (3.11 mole) methanol, 1214 grams (11.45 mole) xylene, 366 grams (4.94 mole) slaked lime.

The slurry was transferred through a funnel into a 5 liters four-neck reactor, provided with an agitator system and a heating/cooling device. Then 380 grams (0.684 mole) of the same alkylbenzene sulfonic acid as Example 1 was added over a period of 15 minutes, and held for 15 minutes. At the end of this period temperature was 40° C. There was a large excess of base.

c) Overbasing Step

Then carbonation was started ($CO_2$ was introduced at the bottom of the reactor through a tube of 2 mm diameter). 162 grams (3.88 mole) $CO_2$ was introduced over a period of two hours. The temperature was kept under control (in order not to exceed 50° C.)

A second slurry was made in a beaker during the above carbonation. That second slurry contained 275 grams (2,59 mole) xylene and 93 grams (1,26 mole) slaked lime. That second slurry was transferred into the reactor through a funnel, once 162 grams of $CO_2$ was added. The introduction of $CO_2$ was not stopped during loading of the second slurry and 50 grams (1.14 mole) more of $CO_2$ was added over a period of 60 minutes. At the end of this step, temperature was between 40 and 45° C.

d) Elimination of Water and Methanol

The product of step (c) was heated in order to eliminate water and methanol.

e) Elimination of Impurities by Centrifugation

To the product of step (d) were added 500 grams diluent oil 600N, 1330 grams xylene, and 200 grams of centrate, which was centrifuged in order to eliminate sediments.

f) Distillation of Xylene

The product of step (e) was distilled to remove xylene. Then the product was cooled down to room temperature. Some solubility problems were met.

Analysis of the product:
Calcium (CaT): 16.0%
CaS: 0.89%
Sulfur: 1.84%
Viscosity at 100° C.: 110 mm/s$^2$
Flash point (PMCC): 200° C.
Base number: 424
Sediment: 0.5% (Volume)
Particles size:
<0.05 μm 0%
<0.075 μm 2.63%
<0.100 μm 38.88%
<0.150 μm 95.57%
<0.200 μm 99.85%
250 μm 100%
Compatibility Test One—Fail
Compatibility Test Two—"Off"

PRODUCTION OF OVERBASED SULFURIZED ALKYLPHENATE

Example 5

This Example used the same principle as Example 1 except that the centrate from the production of highly overbased sulfurized alkylphenate was used instead of using the centrate from the production of high BN overbased alkylaryl sulfonates.

The process used for the preparation of the above high overbased sulfurized alkylphenate is described in British patent 1,015,769, but temperature and pressure was limited during distillation step in order to eliminate water and keep, in the product, most of the residual glycol and almost all of the alcohol having a boiling point higher than 180° C. at atmospheric pressure.

More over, fresh alcohol was added in order to fluidize the medium and improve separation at centrifugation step. The cake (slurry) was then treated in horizontal decanter. The filtrate solid was burnt and the centrate could be recycled in production of high BN overbased alkylaryl sulfonates.

a) Description of the Centrate (for 200 grams)

The centrate contained 91 grams alcohol, 9 grams glycol, 33 grams actives materials (such as calcium alkylphenate and sulfurized calcium alkylphenate), 14 grams basic calcium (as slaked lime and calcium carbonate), 9 grams $CO_2$, and 45 grams diluent oil.

Before recycled of this centrate, decyl alcohol, and glycol were eliminated by distillation final conditions: 220° C. and $4\times10^3$ Pa (30 mm Hg of Mercury). Hold was for one hour and then vacuum was broke.

b) Acidification of the Centrate

After the addition of centrate, 101 grams (5.15 mole) of methanol was introduced in a 5 liters four-neck reactor provided with an agitator system and a heating/cooling device, and the agitator was started, 779 grams (7.35 mole) of xylene was introduced, followed by 380 grams (0.684 mole) of an alkyl benzene sulfonic acid where alkyl chain is a NAO $C_{20-C24}$ added over a period of 15 minutes.

During 15 minutes, methanol, xylene, and sulfonic acid were added at room temperature and centrate at 700° C., due to its viscosity. At the end of the holding period, temperature was 49° C. The mixture was slightly acidic (TAN=9).

c) Overbasing Step

A slurry of 165 grams (5.15 mole) methanol, 435 grams (4.10 mole) xylene, and 366 grams (4.94 mole) slaked lime was transferred into the reactor through a funnel and the inside of the reactor was cooled down to 250° C.

Then carbonation was started ($CO_2$ was introduced at the bottom of the reactor through a tube of 2 mm diameter). 162 grams $CO_2$ was introduced over a period of two hours. The temperature was kept under control (in order not to exceed 45° C.)

A second slurry was made in a beaker during the above carbonation. That second slurry contained 275 grams (2,59 mole) xylene and 93 grams (1,26 mole) slaked lime.

That second slurry was transferred into the reactor through a funnel, once 162 grams of $CO_2$ was added. The introduction of $CO_2$ was not stopped during loading of the second slurry and 50 grams more of $CO_2$ was added over a period of 60 minutes. At the end of this step, temperature was between 40 and 45° C.

d) Elimination of Water and Methanol

The product of step (c) was heated in order to eliminate water and methanol.

e) Elimination of Impurities by Centrifugation

To the product of step (d) were added 500 grams diluent oil 600N and 1330 grams xylene, which was centrifuged in order to eliminate sediments.

f) Distillation of Xylene

The product of step (e) was distilled under vacuum to remove xylene, with the final conditions: 204° C. and $4\times10^3$ Pa (30 mm of Mercury). The distillation occurred for one hour and then vacuum was broken and the product was cooled down to room temperature. There was no problem of solubility.

Analysis of the product:

Calcium (CaT): 16.01%

CaS: 0.89%

Sulfur: 1.98%

Viscosity at 100° C.: 98 $mm/s^2$

Flash point (PMCC): 204° C.

Base number: 423

Sediment: 0.02% (Volume)

Compatibility Test One—Pass

Compatibility Test Two—"In"

ALTERNATE EMBODIMENT

PRODUCTION OF LOW BN OVERBASED ALKYLARYL SULFONATES

In the following examples, the cake from disc centrifuge is not recycled in the production of high BN overbased alkylaryl sulfonates. Instead, in the production of low overbased alkylaryl sulfonate (based on a process described in Applicant's U.S. Pat. No. 4,764,295) or high overbased sulfurized calcium alkylphenate (based British Patent 1.015.769) there was a filtration step on the final products.

The purification treatment in order to eliminate silica and other impurities is not compulsory, but the centrate should be always acidified by sulfonic acid in order to destroy the big particle size of calcium carbonate.

Another change is that the residual solvent in the centrate and the solvent used in low overbased alkylaryl sulfonate and high BN overbased alkylaryl sulfonate is not the same, so one needs to eliminate the solvent out of centrate.

Example 6 a) Acidification Step and Elimination of Solvent of the Cake Disc Centrifuge

In a 4 liters four-neck reactor provided with an agitator system and a heating/cooling device and the agitator was started were introduced 205 grams of the above centricake, 350 g of diluent oil. The reactor was heated to 50° C., then 662 grams were added of an alkylbenzene sulfonic acid where the alkyl chain is a mixture of 80% NAO $C_{20-C24}$ and 20% of branched material. Once addition sulfonic acid was completed, this material was heated up to 85° C. under vacuum in order to eliminate xylene. At this step, a sample of 15 grams was filtered for analysis:

% CaT: 1.49

% CaS: 1.92%

As the calcium total is lower than the Ca sulfonate, that means there is an excess of sulfonic acid.

b) Low Overbasing

In a 4 liters four-neck reactor provided with an agitator system and a heating/cooling device were loaded 1050 grams of above product and 142 grams of 2-ethylhexanol.

The process described in U.S. Pat. No. 4,764,925 was used, but the loads were:

Slaked lime: 34.5 grams

Calcium chloride in water (50/50 weight,%): 23.4 grams

Water: 20.2 grams

Mixture formic acid/acetic acid (50/50 by weight): 10 grams.

Percentage of crude sediment: 0.8

Characteristics on the final product are typical of standard low overbased sulfonate obtained through U.S. Pat. No. 4,764 925.

Analysis of the product:

Calcium (CaT): 2.79%

CaS: 1.83%

Sulfur: 3.55%
Viscosity at 100° C.: 40 mm/s²
Flash point (PMCC): 200° C.
Base number: 23.9
Sediment: 0.01% (Volume)
Compatibility Test Three—Good
There was no solubility problem Example 7

Similar to Example 6, but the 142 grams of 2-ethylhexanol are added at the beginning of acidification step Instead of at overbasing step.

In Example 6, acidification was conducted in presence of xylene. In Example 7, xylene was eliminated prior to acidification and acidification step was conducted in presence of 2-ethylhexanol.

Analysis of the product:
Calcium (CaT): 2.69%
CaS: 1.82%
Sulfur: 3.52%
Viscosity at 100° C.: 50 mm/s²
Flash point (PMCC): 201° C.
Base number: 22
Sediment: 0.02% (Volume)
Compatibility Test Three—Good Example 8

Similar to Example 7 but acidification step was conducted xylene free and 2-ethylhexanol free.

Products from examples 6, 7, and 8 were good in solubility. Example 6 has the lowest crude sediment.

Analysis of the product:
Calcium (CaT): 2.68%
CaS: 1.83%
Sulfur: 3.52%
Viscosity at 100° C.: 50 mm/s²
Flash point (PMCC): 201° C.
Base number: 22
Sediment: 0.02% (Volume)
Compatibility Test Three—Good Comparative Example B The same quantity of raw materials was used in Example 5 but the process is simplified, the acidification step was omitted, as a consequence by particles size of calcium carbonate were not destroyed and the crude sediment was much higher (2.4% instead of 0.6 Vol. %). After filtration, the sediment was still high 0.4 (Vol. %) and some solubility problems were met.

Analysis of the product:
Calcium (CaT): 2.5%
CaS: 1.83%
Sulfur: 3.54%
Viscosity at 100° C.: 80 mm/s²
Flash point (PMCC): 200° C.
Base number: 18
Sediment: 0.2% (Volume)
Compatibility Test Three—Poor

PRODUCTION OF OVERBASED SULFURIZED ALKYLPHENATE

Example 9

In the process described in British Patent A-1.015.769, the high-overbased calcium sulfurized alkylphenate has a small part of low overbased alkylaryl sulfonates. The target of this example is to demonstrate that, after acidification, the sludge obtained on the disc centrifuge during production of high BN overbased alkylaryl sulfonate or overbased sulfurized alkylphenate can be used as this small part of low overbased alkylaryl sulfonates loaded in the production of phenate.

a) Acidification and Elimination of Solvent of the Cake of Disc Centrifuge

The product of step (a) of Example 6 was used. Its characteristics were 1.32% calcium, TAN of 8, and 43% active material as calcium sulfonate.

b) Synthesize of High Overbased Calcium Sulfurized Alkylphenate

In a 4 liters four-neck reactor provided with an agitator system and a heating/cooling device, and the agitator was started, the following were introduced.

818.3 grams (3.12 mole) of dodecylphenol having a molecular weight of 262: alkyl chain is branched and coming from propylene tetramer
750 grams Diluent oil 100N
375.6 grams (5.07 mole) slaked lime
80.1 grams of the above acidified cake The agitation was started and the reactor was heated up to 127° C., then 125.2 grams (3.91 mole) of sulfur was added.

Then the process of high BN overbased sulfurized calcium alkylphenate (based on British patent 1.015.769) was used for sulfurization, carbonation, elimination water, glycol, alcohol and filtration.

Analysis of the product:
Calcium (CaT): 9.79%
CaS: 0.12%
Sulfur: 3.57%
Viscosity at 100° C.: 260 mm/s²
Flash point (PMCC): 204° C.
Base number: 267
Sediment: 0.02% (Volume)
Compatibility Test One—Pass
Compatibility Test Two—"In"

Comparative Example C

In a procedure comparative to Example 9, the disc centrifuge cake loaded was not acidified but only xylene is eliminated and the same quantity (80.1 grams) was loaded.

On the final product, there was higher crude sediment 2.6 (Vol.) instead of 0.8 (Vol. %) and at the filtration step, the clarification was poor (Sediment=0.5 (Vol. %)) and solubility problems were encountered.

Analysis of the product:
Calcium (CaT): 9.1%
CaS: 0.12%
Sulfur: 3.52%
Viscosity at 100° C.: 220 mm/s²
Flash point (PMCC): 202° C.
Base number: 248
Sediment: 0.2% (Volume)
Compatibility Test One—Fail
Compatibility Test Two—"Off"

Comparative Example D

The batch was the same as Comparative Example D but quantity of disc centrifuge cake was increased from 80.1 grams up to 160 grams in order to have the same active material (as calcium sulfonate) as in Example 9. The problems encountered in Comparative Example C were not eliminated.

Analysis of the product:
Calcium (CaT): 9.1%
CaS: 0.12%
Sulfur: 3.50%
Viscosity at 100° C.: 210 C. mm/s$^2$
Flash point (PMCC): 203° C.
Base number: 248
Sediment: 0.25% (Volume)
Compatibility Test One—Fail
Compatibility Test Two—"Off"

Comparative Example E

This procedure was the same as Comparative Example E except that, instead of using the disc centrifuge cake, the centrate from a horizontal decanter was used. This centrate is not acidified and the same problems as in the Comparative Example D were met.

While the present invention has been described with reference to specific embodiments, this application is intended to cover those various changes and substitutions that may be made by those skilled in the art without departing from the spirit and scope of the appended claims.

What is claimed is:

1. A process for using sludge formed in the preparation of a overbased sulfurized alkylphenate, wherein said sludge is separated from the overbased sulfurized alkylphenate, wherein said sludge comprises overbased sulfurized alkylphenate, alkaline earth metal salt, alkaline earth metal base, and other impurities, said process comprising:
    (a) passing said sludge through a phase separation system to form a lower density fraction overbased sulfurized alkylphenate and reduced levels of alkaline earth metal salt, alkaline earth metal base, and other impurities, and a higher density fraction having increased levels of said alkaline earth metal salt, alkaline earth metal base, and other impurities;
    (b) treating said lower density fraction with an acidic reactant, to convert large particles of the alkaline earth metal salt in the lower density fraction into calcium sulfonate, wherein at least one equivalent of acidic reactant is used for each equivalent of alkaline earth metal salt; and
    (c) reacting said treated lower density fraction with alkylphenol, sulfur, and an excess of alkaline earth base to produce a reaction product containing additional overbased sulfurized alkylphenate and additional sludge.

2. A process according to claim 1 wherein said phase separation system is a decanter.

3. A process according to claim 1 wherein said acidic reactant is alkylaryl sulfonic acid.

4. A process according to claim 1 wherein said step (b) is carried out in the presence of a mixture of methanol and xylene.

5. A process according to claim 1 wherein, in step (c), the treated lower density fraction is reacted in the presence of a glycol.

6. A process according to claim 5 wherein, in step (c), the treated lower density fraction is reacted in the presence of glycol and either 2-ethylhexanol or decyl alcohol.

7. A process according to claim 1 wherein, in step (c), the treated lower density fraction is reacted also in the presence of chloride ions and a carboxylic acid containing 1 to 4 carbon atoms.

8. A process according to claim 1 wherein a carbonation step is used for obtaining a high BN overbased alkylarylphenate.

9. A process for using sludge formed in the preparation of an overbased sulfurized alkylphenate, wherein said sludge is separated from the overbased sulfurized alkylphenate, wherein said sludge comprises overbased sulfurized alkylphenate, alkaline earth metal salt, alkaline earth metal base, and other impurities, said process comprising:
    (a) treating said sludge with an acidic reactant to convert large particles of the alkaline earth metal salt in the sludge into calcium sulfonate, wherein at least one equivalent acidic reactant is used for each equivalent of alkaline earth metal salt;
    (b) reacting said treated sludge with alkylphenol, sulfur, and an excess of alkaline earth base, optionally in the presence of a glycol, or in the presence of a glycol and either 2-ethylhexanol or decyl alcohol, to produce a reaction product containing additional overbased sulfurized alkylphenate and additional sludge; and
    (c) filtering said additional sludge from said overbased sulfurized alkylphenate.

10. A process according to claim 9 wherein said acidic reactant is alkylaryl sulfonic acid.

11. A process according to claim 9 wherein said step (b) is carried out in the presence of a mixture of methanol and xylene.

12. A process according to claim 9 wherein, in step (c), the treated lower density fraction is reacted in the presence of a glycol.

13. A process according to claim 12 wherein, in step (c), the treated lower density fraction is reacted in the presence of glycol and either 2-ethylhexanol or decyl alcohol.

14. A process according to claim 9 wherein, in step (c), the treated lower density fraction is reacted also in the presence of chloride ions and a carboxylic acid containing 1 to 4 carbon atoms.

15. A process according to claim 9 wherein a carbonation step is used for obtaining a high BN overbased alkylarylphenate.

* * * * *